United States Patent
Albrecht et al.

(10) Patent No.: US 10,610,946 B2
(45) Date of Patent: Apr. 7, 2020

(54) SYSTEMS AND METHODS FOR AUTOMATED ROOT PASS WELDING

(71) Applicant: ILLINOIS TOOL WORKS INC., Glenview, IL (US)

(72) Inventors: Bruce Patrick Albrecht, Neenah, WI (US); Steven Edward Barhorst, Sidney, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 267 days.

(21) Appl. No.: 14/961,263

(22) Filed: Dec. 7, 2015

(65) Prior Publication Data

US 2017/0157693 A1 Jun. 8, 2017

(51) Int. Cl.
  *B23K 9/09* (2006.01)
  *B23K 9/095* (2006.01)
  *B23K 9/00* (2006.01)
  *B23K 9/028* (2006.01)
  *B23K 101/06* (2006.01)

(52) U.S. Cl.
  CPC .......... *B23K 9/0956* (2013.01); *B23K 9/0052* (2013.01); *B23K 9/0282* (2013.01); *B23K 9/09* (2013.01); *B23K 2101/06* (2018.08); *Y10S 901/42* (2013.01)

(58) Field of Classification Search
  CPC ............. B23K 2201/06; B23K 9/0052; B23K 9/0282; B23K 9/09; B23K 9/0956; B23K 9/095; Y10S 901/42
  USPC ............................................. 219/60 R, 60 A
  See application file for complete search history.

(56) References Cited

U.S. PATENT DOCUMENTS

| | | | |
|---|---|---|---|
| 2,365,958 A | 12/1944 | Holslag | |
| 2,416,047 A | 2/1947 | Dolan | |
| 3,288,982 A | 11/1966 | Haruyoshi | |
| 3,627,972 A * | 12/1971 | Iceland | B23K 9/0956 219/130.21 |
| 3,725,629 A | 4/1973 | Vickers | |

(Continued)

FOREIGN PATENT DOCUMENTS

| | | |
|---|---|---|
| CA | 1276245 | 11/1990 |
| CA | 2072711 | 12/1992 |

(Continued)

OTHER PUBLICATIONS

Translation KR 1020100107863.*

(Continued)

*Primary Examiner* — Ibrahime A Abraham
*Assistant Examiner* — Frederick F Calvetti
(74) *Attorney, Agent, or Firm* — McAndrews, Held & Malloy, Ltd.

(57) ABSTRACT

An automated welding system includes a welding robot and control circuitry. The welding bug robot includes a welding torch. The welding bug robot is configured to move on a track disposed around a circumference of a first pipe and perform a root pass welding operation at a joint between the first pipe and a second pipe. The control circuitry is configured to control movement of the welding bug robot around the circumference of the first pipe, apply a high energy welding phase via the welding torch to establish a first root condition, and apply a low energy welding phase via the welding torch to establish a second root condition.

32 Claims, 7 Drawing Sheets

(56) References Cited

U.S. PATENT DOCUMENTS

| | | | | |
|---|---|---|---|---|
| 3,809,853 | A | 5/1974 | Manz | |
| 3,819,902 | A * | 6/1974 | Sidbeck | B23K 9/127 219/124.34 |
| 3,849,871 | A | 11/1974 | Kaunitz | |
| 3,946,349 | A | 3/1976 | Haldeman | |
| 4,145,593 | A * | 3/1979 | Merrick | B23K 9/0286 219/125.11 |
| 4,160,967 | A | 7/1979 | Beech | |
| 4,188,419 | A | 2/1980 | Detert | |
| 4,222,023 | A | 9/1980 | Beech | |
| 4,283,617 | A * | 8/1981 | Merrick | B23K 9/0286 219/125.1 |
| 4,426,565 | A | 1/1984 | Rueter | |
| 4,447,703 | A | 5/1984 | Stol | |
| 4,467,176 | A | 8/1984 | Mizuno | |
| 4,493,971 | A | 1/1985 | Nawa | |
| 4,531,040 | A | 7/1985 | Nawa | |
| 4,536,634 | A | 8/1985 | Nawa | |
| 4,546,234 | A | 10/1985 | Ogasawara | |
| 4,580,026 | A | 4/1986 | Stol | |
| 4,628,182 | A | 12/1986 | Hori | |
| 4,631,385 | A | 12/1986 | Rothermel | |
| 4,667,083 | A | 5/1987 | Stol | |
| 4,728,761 | A | 3/1988 | Mucha | |
| 4,827,101 | A * | 5/1989 | Sugitani | B23K 9/0956 219/124.1 |
| 4,897,523 | A | 1/1990 | Parks | |
| 4,950,348 | A | 8/1990 | Larsen | |
| 4,954,691 | A | 9/1990 | Parks | |
| 4,973,821 | A | 11/1990 | Martin | |
| 5,001,326 | A | 3/1991 | Stava | |
| 5,043,557 | A | 8/1991 | Tabata | |
| 5,086,207 | A | 2/1992 | Deam | |
| 5,101,086 | A | 3/1992 | Dion | |
| 5,118,028 | A | 6/1992 | Ogawa | |
| 5,140,123 | A | 8/1992 | Mitani | |
| 5,148,001 | A | 9/1992 | Stava | |
| 5,208,433 | A | 5/1993 | Hellegouarc | |
| 5,270,516 | A | 12/1993 | Hamamoto | |
| 5,278,390 | A | 1/1994 | Blankenship | |
| 5,315,089 | A | 5/1994 | Hughes | |
| 5,319,179 | A | 6/1994 | Joecks | |
| 5,343,023 | A | 8/1994 | Geissler | |
| 5,349,156 | A | 9/1994 | Madigan | |
| 5,352,871 | A | 10/1994 | Ross | |
| 5,367,138 | A | 11/1994 | Moss | |
| 5,412,184 | A | 5/1995 | McGaffigan | |
| 5,461,215 | A | 10/1995 | Haldeman | |
| 5,466,916 | A | 11/1995 | Iguchi | |
| 5,504,309 | A | 4/1996 | Geissler | |
| 5,526,561 | A | 6/1996 | McGaffigan | |
| 5,710,413 | A | 1/1998 | King | |
| 5,714,738 | A | 2/1998 | Hauschulz | |
| 5,739,506 | A | 4/1998 | Hanton | |
| 5,742,029 | A | 4/1998 | Stava | |
| 5,756,967 | A | 5/1998 | Quinn | |
| 5,773,799 | A | 6/1998 | Maxfield | |
| 5,783,799 | A | 7/1998 | Geissler | |
| 5,844,193 | A | 12/1998 | Nomura | |
| 5,963,022 | A | 10/1999 | Buda | |
| 5,968,587 | A | 10/1999 | Frankel | |
| 6,002,104 | A | 12/1999 | Hsu | |
| 6,008,470 | A | 12/1999 | Zhang | |
| 6,043,471 | A | 3/2000 | Wiseman | |
| 6,051,810 | A | 4/2000 | Stava | |
| 6,090,067 | A | 7/2000 | Carter | |
| 6,091,048 | A * | 7/2000 | Lanouette | B23K 9/095 219/130.21 |
| 6,107,602 | A | 8/2000 | Geissler | |
| 6,115,273 | A | 9/2000 | Geissler | |
| 6,169,263 | B1 | 1/2001 | Derby | |
| 6,204,476 | B1 | 3/2001 | Reynolds | |
| 6,248,975 | B1 * | 6/2001 | Lanouette | B23K 9/095 219/130.21 |
| 6,248,976 | B1 | 6/2001 | Blankenship | |
| 6,265,688 | B1 | 7/2001 | Lyshkow | |
| 6,278,074 | B1 | 8/2001 | Morlock | |
| 6,292,715 | B1 | 9/2001 | Rongo | |
| 6,331,694 | B1 | 12/2001 | Blankenship | |
| 6,359,258 | B1 | 3/2002 | Blankenship | |
| 6,479,792 | B1 | 11/2002 | Beiermann | |
| 6,486,439 | B1 | 11/2002 | Spear | |
| 6,515,259 | B1 | 2/2003 | Hsu | |
| 6,583,386 | B1 | 6/2003 | Ivkovich | |
| 6,596,970 | B2 | 7/2003 | Blankenship | |
| 6,624,388 | B1 | 9/2003 | Blankenship | |
| 6,642,482 | B2 | 11/2003 | Rappl | |
| 6,670,579 | B2 | 12/2003 | Davidson | |
| 6,707,001 | B1 | 3/2004 | Ulrich | |
| 6,710,297 | B1 | 3/2004 | Artelsmair | |
| 6,720,529 | B2 | 4/2004 | Davidson | |
| 6,744,012 | B2 | 6/2004 | Ueda | |
| 6,747,247 | B2 | 6/2004 | Holverson | |
| 6,849,828 | B2 | 2/2005 | Aigner | |
| 6,906,284 | B2 | 6/2005 | Kim | |
| 6,909,067 | B2 | 6/2005 | Davidson | |
| 6,933,466 | B2 | 8/2005 | Hutchison | |
| 6,958,263 | B2 | 10/2005 | Bhattacharyya | |
| 6,974,931 | B2 | 12/2005 | Holverson | |
| 6,974,932 | B2 | 12/2005 | Holverson | |
| 6,984,806 | B2 | 1/2006 | Huismann | |
| 6,995,338 | B2 | 2/2006 | Hutchison | |
| 7,002,103 | B2 | 2/2006 | Holverson | |
| 7,129,443 | B2 | 10/2006 | Davidson | |
| 7,145,101 | B2 | 12/2006 | Tong | |
| 7,244,905 | B2 | 7/2007 | Das | |
| 7,265,320 | B2 | 9/2007 | Ou | |
| 7,304,269 | B2 | 12/2007 | Fulmer | |
| 7,307,240 | B2 | 12/2007 | Holverson | |
| 7,351,933 | B2 | 4/2008 | Huismann | |
| 7,683,290 | B2 | 3/2010 | Daniel | |
| 8,203,100 | B2 | 6/2012 | Ueda | |
| 8,288,686 | B2 | 10/2012 | Kaufman | |
| 8,455,793 | B2 * | 6/2013 | Domec | B23K 9/0282 219/121.78 |
| 8,487,215 | B2 | 7/2013 | Holverson | |
| 8,541,746 | B2 * | 9/2013 | Andres | B23K 9/0956 250/336.1 |
| 9,403,231 | B2 | 8/2016 | Hutchison | |
| 9,539,662 | B2 | 1/2017 | Hutchison | |
| 2002/0008095 | A1 | 1/2002 | Norrish | |
| 2002/0045970 | A1 | 4/2002 | Krause | |
| 2002/0107825 | A1 | 8/2002 | Manicke | |
| 2002/0117487 | A1 | 8/2002 | Corby | |
| 2002/0117488 | A1 | 8/2002 | Arndt | |
| 2003/0058149 | A1 | 3/2003 | Jayadeva | |
| 2004/0010342 | A1 | 1/2004 | Thelen | |
| 2004/0069759 | A1 | 4/2004 | Davidson | |
| 2004/0182828 | A1 | 9/2004 | Schmidt | |
| 2004/0222204 | A1 | 11/2004 | Hutchison | |
| 2004/0238511 | A1 | 12/2004 | Matus | |
| 2005/0184039 | A1 | 8/2005 | Stava | |
| 2005/0269306 | A1 | 12/2005 | Fulmer | |
| 2006/0163229 | A1 | 7/2006 | Hutchison | |
| 2007/0051711 | A1 | 3/2007 | Kachline | |
| 2007/0084840 | A1 | 4/2007 | Davidson | |
| 2007/0102407 | A1 | 5/2007 | Uezono | |
| 2007/0170163 | A1 | 7/2007 | Narayanan | |
| 2007/0235434 | A1 | 10/2007 | Davidson | |
| 2007/0241087 | A1 * | 10/2007 | Peters | B23K 9/0216 219/137 PS |
| 2007/0267394 | A1 | 11/2007 | Beck | |
| 2008/0264916 | A1 | 10/2008 | Nagano | |
| 2008/0264917 | A1 | 10/2008 | White | |
| 2008/0264923 | A1 | 10/2008 | White | |
| 2009/0026188 | A1 | 1/2009 | Schorghuber | |
| 2009/0173726 | A1 | 7/2009 | Davidson | |
| 2010/0059493 | A1 | 3/2010 | McAninch | |
| 2010/0096373 | A1 | 4/2010 | Hillen | |
| 2010/0133250 | A1 | 6/2010 | Sardy | |
| 2010/0176104 | A1 | 7/2010 | Peters | |
| 2010/0308026 | A1 | 12/2010 | Vogel | |
| 2010/0308027 | A1 | 12/2010 | Vogel | |

(56) References Cited

U.S. PATENT DOCUMENTS

| | | | |
|---|---|---|---|
| 2010/0314362 A1* | 12/2010 | Albrecht | B23K 9/0953 219/121.63 |
| 2010/0314371 A1 | 12/2010 | Davidson | |
| 2011/0095008 A1* | 4/2011 | Birt, Jr. | B23K 9/0956 219/130.01 |
| 2011/0108527 A1* | 5/2011 | Peters | B23K 9/09 219/73.2 |
| 2011/0114612 A1 | 5/2011 | Holverson | |
| 2011/0163080 A1 | 7/2011 | Beck | |
| 2011/0204034 A1 | 8/2011 | Schartner | |
| 2011/0297658 A1 | 8/2011 | Peters | |
| 2011/0248007 A1 | 10/2011 | Takeda | |
| 2012/0024828 A1 | 2/2012 | Oowaki | |
| 2012/0061362 A1 | 3/2012 | Davidson | |
| 2012/0074112 A1 | 3/2012 | Kotera | |
| 2012/0097655 A1 | 4/2012 | Daniel | |
| 2012/0248080 A1 | 10/2012 | Hutchison | |
| 2012/0291172 A1 | 11/2012 | Wills | |
| 2012/0298642 A1 | 11/2012 | Lambert | |
| 2013/0112674 A1 | 5/2013 | Mnich | |
| 2013/0112676 A1 | 5/2013 | Hutchison | |
| 2013/0264323 A1 | 10/2013 | Daniel | |
| 2013/0270245 A1 | 10/2013 | Holverson | |
| 2013/0327749 A1* | 12/2013 | Denney | B23K 9/0956 219/137 PS |
| 2014/0021183 A1 | 1/2014 | Peters | |
| 2014/0027426 A1* | 1/2014 | Hutchison | B23K 35/3602 219/130.5 |
| 2014/0131333 A1* | 5/2014 | Zhang | B23K 9/0956 219/130.31 |
| 2014/0138364 A1* | 5/2014 | Aberg | B23K 9/1006 219/130.1 |
| 2014/0158669 A1 | 6/2014 | Davidson | |
| 2014/0183176 A1 | 7/2014 | Hutchison | |
| 2014/0217077 A1 | 8/2014 | Davidson | |
| 2014/0251971 A1 | 9/2014 | Hearn | |
| 2014/0263237 A1 | 9/2014 | Daniel | |
| 2014/0263241 A1 | 9/2014 | Henry | |
| 2014/0263243 A1 | 9/2014 | Marschke | |
| 2014/0367370 A1 | 12/2014 | Hutchison | |
| 2015/0001197 A1 | 1/2015 | Marschke | |
| 2015/0076119 A1* | 3/2015 | Hsu | B23K 9/0956 219/74 |
| 2015/0083702 A1 | 3/2015 | Scott | |
| 2015/0105898 A1 | 4/2015 | Adams | |
| 2015/0122781 A1* | 5/2015 | Albrecht | B23K 9/0953 219/73 |
| 2015/0251275 A1* | 9/2015 | Denney | B23K 26/24 219/121.64 |
| 2015/0283638 A1* | 10/2015 | Henry | B23K 35/3053 219/130.51 |
| 2015/0283639 A1* | 10/2015 | Henry | B23K 35/3053 219/130.51 |
| 2015/0290735 A1* | 10/2015 | Beattie | B23K 9/0325 700/166 |
| 2015/0379894 A1* | 12/2015 | Becker | G09B 9/00 219/124.1 |
| 2016/0074954 A1 | 3/2016 | Marschke | |
| 2016/0144444 A1 | 5/2016 | Davidson | |
| 2016/0167151 A1 | 6/2016 | Mehn | |
| 2016/0193680 A1* | 7/2016 | Pesme | B23K 9/0956 219/124.34 |
| 2016/0193681 A1* | 7/2016 | Pesme | B23K 9/0956 219/130.01 |
| 2016/0288235 A1 | 10/2016 | Davidson | |
| 2016/0318112 A1 | 11/2016 | Hutchison | |
| 2017/0165777 A1* | 6/2017 | Aberg | B23K 9/1062 |
| 2017/0182605 A1* | 6/2017 | Rajagopalan | B23K 37/003 |
| 2017/0209950 A1* | 7/2017 | Nishimura | B23K 9/0953 |
| 2018/0029154 A1* | 2/2018 | Rajagopalan | B23K 9/0282 |
| 2018/0031152 A1* | 2/2018 | Rajagopalan | B23K 37/003 |
| 2018/0117718 A1* | 5/2018 | Rajagopalan | B23K 37/0531 |

FOREIGN PATENT DOCUMENTS

| | | |
|---|---|---|
| CN | 2181354 | 11/1994 |
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102596475 | 7/2012 |
| CN | 102770228 | 11/2012 |
| CN | 202824943 | 3/2013 |
| DE | 2501928 | 7/1976 |
| DE | 3443493 | 7/1985 |
| DE | 8337771 | 8/1985 |
| DE | 19808383 | 9/1999 |
| EP | 0194045 | 9/1986 |
| EP | 0387223 | 9/1990 |
| EP | 1232825 | 8/2002 |
| EP | 2218537 | 8/2010 |
| EP | 2286949 | 2/2011 |
| FR | 1443701 | 6/1966 |
| FR | 2560089 | * 8/1985 |
| JP | S5719166 | 2/1982 |
| JP | S57109573 | 7/1982 |
| JP | S60108175 | 6/1985 |
| JP | S60108176 | 6/1985 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001025866 | 1/2001 |
| JP | 2001276971 | 10/2001 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 20100107863 | 10/2010 |
| KR | 1020120027764 | 3/2012 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2008027612 | 3/2008 |

OTHER PUBLICATIONS

Translation JP2001025866.*
Translation FR2560089.*
"ALT 304," Miller—The Power of Blue, Jun. 2001.
"Maxstar 200 SD, DX, and LX," Miller Electric Mfg. Co., Oct. 2003.
Bondy et al., "Graph Theory with Applications," Department of Combinatorics and Optimization, University of Waterloo, 1976, p. 7-8.
Extended European Search Report for EP Application No. 16194312. 1, dated May 19, 2017, 10 pgs.

* cited by examiner

SYSTEMS AND METHODS FOR AUTOMATED ROOT PASS WELDING

BACKGROUND

The present disclosure relates generally to the field of welding systems and, more particularly, to automated systems for performing root pass welding operations.

Welding is a process that has become ubiquitous in various industries for a variety of applications. For example, welding is often used in applications such as shipbuilding, offshore platform, construction, pipe mills, and so forth. Arc welding systems generally apply electrical current to an electrode to form an arc between the electrode and a workpiece, thereby forming a weld deposit on the workpiece. In general, the electrode may be a continuous, welding wire that is advanced by the welding system to reach the workpiece. Moreover, forces (e.g., gravity) on the weld deposit may differently affect the shape and structure of the weld deposit based on the welding position of the torch and the electrode relative to the workpiece.

BRIEF DESCRIPTION

In one embodiment, an automated root pass welding system includes a welding robot and control circuitry. The welding bug robot includes a welding torch. The welding bug robot is configured to move about a surface of a first workpiece and perform a root pass welding operation at a joint between the first workpiece and a second workpiece. The control circuitry is configured to control movement of the welding robot and the first workpiece relative to one another, apply a high energy welding phase via the welding torch to establish a first root condition, and apply a low energy welding phase via the welding torch to establish a second root condition.

In another embodiment a system includes a welding robot, a sensor, and control circuitry. The welding robot comprises a welding torch. The welding bug robot is configured to move around a circumference of a first pipe and perform a root pass welding operation at a joint between the first pipe and a second pipe. The sensor is configured to detect one or more parameters indicative of first and second root conditions, and to output a root condition signal. The control circuitry is configured to receive the root condition signal from the sensor, control movement of the welding bug robot and the first pipe relative to one another based at least in part on the received root condition signal, control a rate at which a wire feeder supplies welding wire to the welding robot based at least in part on the received root condition signal, control an amount of welding power a power supply supplies to the welding robot based at least in part on the received root condition signal, apply a high energy welding phase of the welding power until the root condition signal indicates establishment of the first root condition, and apply a low energy welding phase of the welding power until the root condition signal indicates establishment of the second root condition.

In a third embodiment, a welding method includes applying a high energy welding phase of welding power, using a welding torch attached to a welding robot, to a joint formed between first and second sections of pipe until a first root condition is established, applying a low energy welding phase of the welding power to the joint until a second root condition is established, and moving the welding robot and the first section of pipe relative to one another.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

When sections of pipe are being welded together (e.g., a root pass welding operation), forces on the weld deposit, such as gravity, may have different effects on the weld deposit based on the position of the welding torch and the electrode as one moves around the circumference of the sections of pipes. Furthermore, variances within allowable manufacturing tolerances for the sections of pipe may lead to some sections of pipe fitting together better than others. While an experienced operator may be able to account for these variables as the torch moves around the circumference of the pipe (e.g., varying the voltage or current of the torch, or spending more time at a particular welding location), accounting for these variables may be challenging for automated welding systems. Though specific embodiments shown are for two sections of pipe, it should be understood that the disclosed techniques may be applied to workpieces of any shape or size. Though workpieces may be referred to hereinafter as pipes, it should be understood that workpieces of any size or shape may be used.

Present embodiments include an automated welding system that cycles between high energy (a pulse, series of pulses, or high energy process) and low energy (a pulse, series of pulses, or lower energy process that transfers metal assisted by current) welding phases during performance of the welding operation based on the root condition. The automated welding system may include a welding torch mounted to a welding automation device (e.g., a robot or a "welding bug") that travels around the circumference of the pipe and one or more control systems configured to provide power and consumable welding electrode or wire to the welding torch, and to control the welding robot. The automated welding system may also include a sensor disposed inside or outside the pipe that is configured to sense the root condition. The automated welding system may be configured to use a high energy (e.g., 300 amps) welding phase to create a keyhole, and then switch to a low energy (e.g., 100 amps) welding phase to fill the joint by depositing welding material. Such energy levels may correspond with robot travel speed and/or wire feed speed. The systems and techniques described herein may improve the quality of automated root pass welds.

Figure 1:
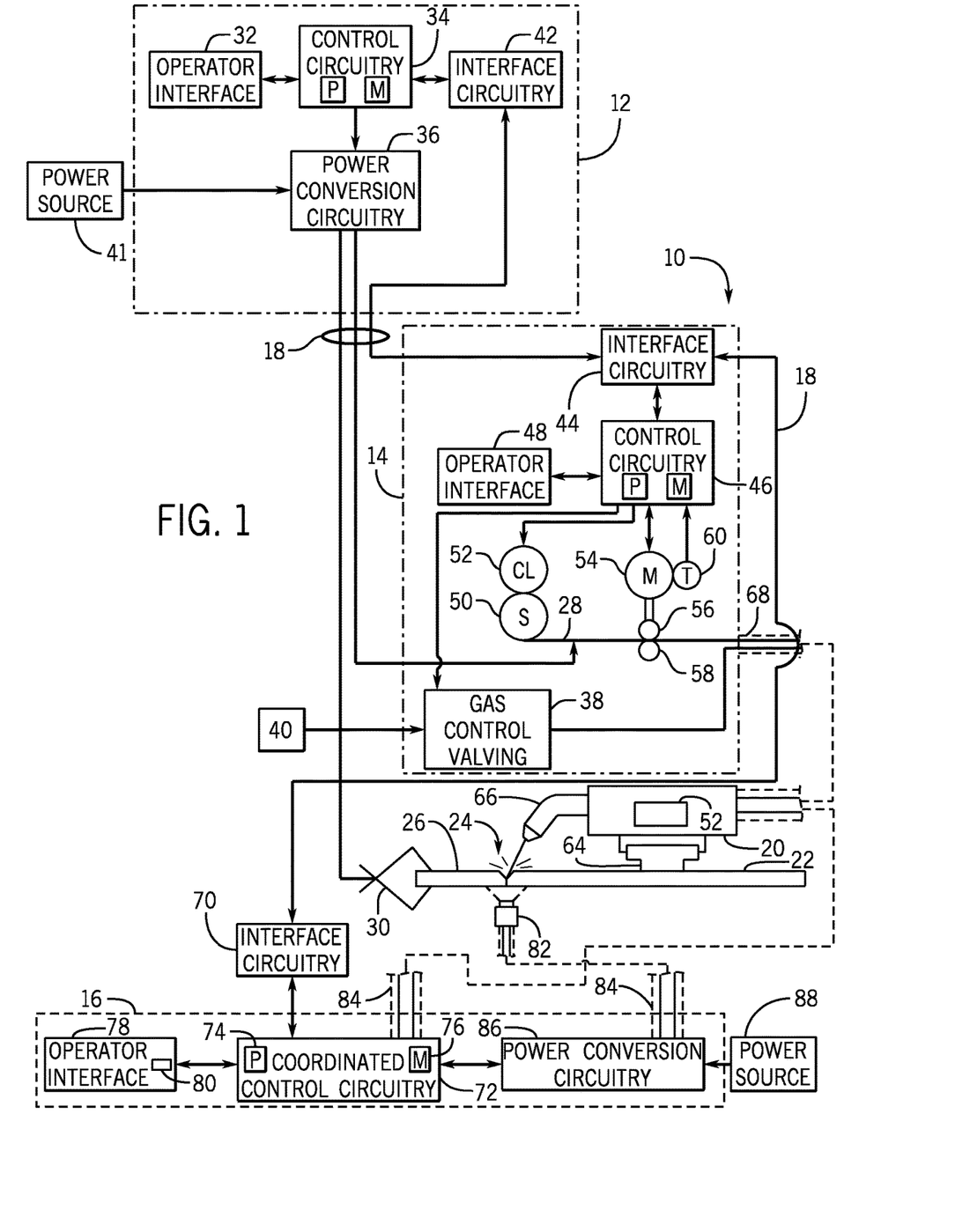
FIG. 1 is an embodiment of an automated root pass welding system in accordance with aspects of the present disclosure.

Turning now to the drawings, FIG. 1 illustrates an embodiment of an automated welding system 10 that has a power supply 12, a wire feeder 14, and coordinated control system 16 coupled to one another via conduits 18. In the illustrated embodiment, the power supply 12, wire feeder 14, and coordinated control system 16 are separate from one another, such that the power supply 12, the wire feeder 12, and the coordinated control system 16 may be positioned at some distance from one another. However, it should be understood that the power supply 12, the wire feeder 14, and the coordinated control system 16, in some embodiments, may be integral with one another. In such cases, the conduits 18 would be internal to the system. In embodiments in which the power supply 12, the wire feeder 14, and the coordinated control system 16 are separate from one another, terminals may be provided on the power supply 12, the wire feeder 14, and the coordinated control system 16 to allow the conduits 18 to be coupled to the systems 12, 14, 16 so as to allow for power, gas and data to be exchanged between the three systems 12, 14, 16.

The welding system 10 is designed to provide control, power, and shielding gas to a welding robot 20 (e.g., a bug, or any other fixed or flexible automation). The welding robot 20 is configured to move around the circumference of a first section of pipe 22 and perform a welding operation along a joint 24 where the first section of pipe butts up against a second section of pipe 26. In some embodiments, the wire feeder 14 provides welding wire 28 (e.g., electrode) to the welding robot 20. It should be appreciated that the presently disclosed methods may be used in a wide range of systems using any arc welding process which may or may not use a gas line (e.g., FCAW-O (self-shielded), FCAW-G, GMAW, MCAW, GTAW (i.e., TIG), or similar arc welding process). As will be appreciated by those skilled in the art, the welding robot 20 may be of many different types, and typically allows for the feed of a welding wire 28 and gas to a location adjacent to the joint 24 where a weld is to be formed to join two or more sections of pipe 22, 26. A second conductor (e.g., clamp 58) is typically coupled to the sections of pipe 22, 26 so as to complete an electrical circuit between the power supply 12 and the sections of pipe 22, 26 through the welding robot 20.

The operator of the welding system 10 may select data settings (e.g., weld parameters, gas flow parameters, arc length) via an operator interface 32 provided on the power supply 12. The operator interface 32 communicates the data settings to control circuitry 34 within the power supply 12. The control circuitry 34 may control power conversion circuitry 36 based at least in part on the weld parameters, and the control circuitry 34 may control gas control valving 38 of the power supply 12 or the wire feeder 14 based at least in part on the gas flow parameters. It should be noted that some embodiments (e.g., FCAW welding systems) may not use shielding gas, and thus may not have gas control valving 38. In some embodiments, the operator interface 32 is incorporated into a front faceplate of the power supply 12. In some embodiments, the welding system 10 may be configured to allow for MIG welding with various steels (e.g., high alloy steels, low alloy steels), aluminums, or other welding wire that is channeled through the welding robot 20. The gas control valving 38 may direct a shielding gas 40 to the joint 24 of the sections of pipe 22, 26 via the welding robot 20. However, in some embodiments, the automated welding system 10 may be configured for flux-cored arc welding (FCAW), or other types of welding, which may allow for self-shielding. Such embodiments may not include the gas control valving 38.

The control circuitry 34 operates to control generation of welding power output from the power conversion circuitry 36 that is applied to the welding wire 28 for carrying out the desired welding operation. This power conversion circuitry 36 is adapted to create the output power that will ultimately be applied to the welding wire 28 at the welding robot 20, which may include AC variable polarity, pulsed power, etc. Various power conversion components may be employed within the power conversion circuitry 36, including, but not limited to, choppers, boost circuitry, buck circuitry, inverters, converters, transformers, and so forth. The configuration of such power conversion circuitry 36 may be of types generally known in the art in and of itself. The power conversion circuitry 36 is coupled to a power source 41. The power applied to the power conversion circuitry 36 may originate in the power grid, although other sources of power may also be used, such as power generated by an engine-driven generator, batteries, fuel cells or other alternative sources. Finally, the power supply 12 illustrated in FIG. 1 includes interface circuitry 42 (e.g., communications circuitry) designed to allow the control circuitry 34 to exchange signals with the wire feeder 14, or the coordinated control system 16 via wired or wireless signals.

The wire feeder 14 includes complimentary interface circuitry 44 (e.g., communications circuitry) that is coupled to the interface circuitry 42 via a wired or wireless connection. In some embodiments, multi-pin interfaces may be provided on both interface circuitry components 42, 44 and a multi-conductor cable run between the respective interface circuitry components enables information, such as wire feed speeds, processes, selected currents, voltages, arc lengths, power levels, or gas flow levels, and so forth, to be set on either the power supply 12, the wire feeder 14, the coordinated control system 16, or any combination thereof. The wire feeder 14 may be configured for normal one-directional wire feed, and/or for a reciprocating controlled short circuit (CSC) wire motion cycle, whereby the wire 28 moved forward into the weld pool and is retracted out, otherwise known as wire stitching motion.

The wire feeder 14 also includes control circuitry 46 coupled to the interface circuitry 44. The control circuitry 46 allows for wire feed speeds to be controlled in accordance with operator selections, and permits these settings to be fed back to the power supply 12, and/or the coordinated control circuitry 16 via the interface circuitry 44. The control circuitry 46 is coupled to an operator interface 48 on the wire feeder 14 that allows selection of one or more weld parameters, particularly wire feed speed. The operator interface 48 may also allow for selection of such weld parameters as the process, the type of wire utilized, current, voltage, arc length, power settings, or gas flow levels, and so forth. In some embodiments, the control circuitry 46 may also be coupled to gas control valving 38 which regulates the flow of shielding gas to the welding robot 20 and/or to the back surface of the joint 24. In general, such gas is provided at the time of welding, and may be turned on immediately preceding the weld and/or for a short time following the weld.

The wire feeder 14 includes components for feeding wire 28 to the welding robot 20 and thereby to the welding application, under the control of control circuitry 46. For example, one or more spools 50 of welding wire may be housed in the wire feeder 14. Welding wire 28 is unspooled from the spools 50 and is progressively fed to the welding robot 20. In certain embodiments, the spool 40 may be associated with a clutch 52 that disengages the spool 40 when wire 28 is to be fed to the welding robot 20. The clutch 52 may also be regulated to maintain a minimum friction level to avoid free spinning of the spool 50. A feed motor 54 is provided that engages with feed rollers 56 to push wire 28 from the wire feeder 14 toward the welding robot 20. In practice, one of the rollers 56 is mechanically coupled to the feed motor 54 and is rotated by the feed motor 54 to drive the wire 28 from the wire feeder 14, while the mating roller 58 is biased towards the wire 28 to maintain contact between the two rollers 56, 58 and the wire 28. Some systems may include multiple rollers 56 of this type. Finally, in certain embodiments, a tachometer 60 may be provided for detecting the speed of the motor 54, the rollers 56, 58, or any other associated component so as to provide an indication of the actual wire feed speed. Signals from the tachometer 60 are fed back to the control circuitry 46, such as for calibration.

It should be noted that other system arrangements and input schemes may also be implemented. For example, in certain embodiments, the welding wire 28 may be fed from a bulk storage container (e.g., a drum) or from one or more spools 50 outside of the wire feeder 14. Similarly, in certain embodiments, the wire 28 may be fed from a spool 50 mounted on or near the welding robot 20. In some embodiments, a robotic system 62 coupled to, or incorporated into, the welding robot 20 controls the movement of the welding robot 20 relative to the joint 24. As discussed in detail herein, the welding robot 20 may be configured to move along a track 64, or other guide. Track 64 may be temporarily or permanently coupled (e.g., clamped, adhered, riveted, screwed, etc.) to the first or second sections of pipe 22, 26 and adjacent to the joint 24. The welding robot 20 may be configured to move along the track 64, passing a welding torch 66 along the joint 24 of the two sections of pipe 22, 26 during welding.

Power from the power supply 12 is applied to the wire 28, typically by means of a welding cable 68 in a conventional manner. Similarly, shielding gas may be fed through the wire feeder 14 and the welding cable 68. During welding operations, the wire 28 is advanced through a welding cable jacket toward the torch 66. Within the torch 66, an additional pull motor (shown in FIG. 2) may be provided with an associated drive roller, particularly for aluminum alloy welding wires. These processes are also described in greater detail below. A workpiece cable and clamp 30 may allow for closing an electrical circuit from the power supply through the welding torch 66, the electrode (welding wire 28), and the sections of pipe 22, 26 for maintaining the welding arc during the welding operation.

The coordinated control system 16 is configured to control the welding robot 20. In some embodiments, the coordinated control system 16 may be configured to control the power supply 12, the wire feeder 14, and the robotic system 62 such that the coordinated control system 16 has control over the movement of the welding robot 20 around the tack 64, as well as the performance of a welding operation by the welding robot 20. The robotic system 62 may control the welding robot 20 and the welding torch 66 such that the torch 66 may move in three dimensions. For example, the movement of the welding torch 66 during a welding operation may be substantially parallel or perpendicular (e.g., within 2 degrees of true parallel or perpendicularity) to the direction of travel of the welding robot 20 (e.g., weaving).

In other embodiments, the welding torch 66 may perform spin arc welding. That is, the welding torch 66 may be configured to move the wire 28 in a desired pattern with respect to a central axis of the welding torch 66 by a motion control assembly (e.g., a motor and a cam). Material from the welding wire 28 is deposited as the welding wire 28 moves in the desired pattern of motion (e.g., circular pattern). The wire feed speed and contact tip to workpiece distance (CTWD) parameters may be defined herein as axial movement relative to an axis of the torch 66, whereas the movement of the wire 28 in a plane perpendicular to the axis of the torch 66 may be defined as radial movement. The radial movement of the wire 28 may include movement in a pattern (e.g., circular pattern) in the plane perpendicular to the axis of the torch 66 and rotational (e.g., spinning) movement of the wire 28 in the plane perpendicular to the axis of the torch 66. In some embodiments, the radial movement may be controlled independent of the axial movement of the wire 28. Accordingly, the deposition rate of the wire 28 may be substantially independent of the radial movement of the wire 28.

The rate of radial movement may be based at least in part on a shielding gas, the wire diameter, the wire material, the workpiece material, the welding process, the movement pattern, or the surface tension of the molten electrode ball, or any combination thereof. The range of radial movement rates may correspond to certain types of transfer processes and/or movement patterns. For example, the radial movement rate for SAW welding processes may be less (e.g., 5 Hz to 30 Hz) than MIG welding processes, which may be utilized with radial movement rates between approximately 50 Hz to 100 Hz. In some embodiments, a figure-8 or a circular movement pattern may have a lower radial movement rate than a zigzag movement pattern. Moreover, diameters of radial movement are presently contemplated on the order of approximately 1.0 to 1.5 mm, but higher diameters, such as on the order of approximately 4.0 mm may be desired. It may also be desirable to provide electrode movement that is synchronized or coordinated with gas flow. These various parameters may assist in the penetration into the base materials, the deposition of the electrode material, the maintenance of the arc, as well as other welding parameters. Disclosure and more detailed description of spin arc welding techniques are set forth in U.S. patent application Ser. No. 14/481,507 entitled "SYNCHRONIZED ROTATING ARC WELDING METHOD AND SYSTEM," filed on Sep. 9, 2014, which is hereby incorporated into the present disclosure in its entirety.

In some embodiments, the coordinated control system 16 may be in communication with the power supply 12 and wire feeder 14, but may only have control over the robotic system 62. The coordinated control system 16 may include interface circuitry 70 that is coupled to the interface circuitry 42, 44 of the power supply 12 and wire feeder 14, respectively, via a wired or wireless connection. In some embodiments, multi-pin interfaces may be provided on the interface circuitry components 42, 44, 70 and a multi-conductor cable connected between the respective interface circuitry components enables information such as wire feed speeds, processes, selected currents, voltages, arc lengths, power levels, gas flow levels, speed or position of the welding robot 20, and so forth, to be set via either the power supply 12, the wire feeder 16, the coordinated control system 16, or any combination thereof.

The coordinated control system 16 may also include coordinated control circuitry 72 coupled to the interface circuitry 70. The coordinated control circuitry 72 controls the welding robot 20. In some embodiments, the coordinated control circuitry may control the wire feed speed, the welding power, and the position of the welding robot 20 in accordance with operator selections. In other embodiments, the coordinated control circuitry 72 may only control the position of the welding robot 20 through the robotic system 62. The coordinated control circuitry 72 may include a processor 74 and a memory component 76. The processor 74 may be configured to execute instructions, run programs, analyze data, and the like. The memory component 76 may be configured to store instructions, programs, data, etc. The memory component 76 may be any non-transitory computer readable medium.

The coordinated control circuitry 72 may be coupled to an operator interface 78, which may allow selection of one or more parameters (e.g., position of the welding robot 20, a welding operation routine, welding process, wire feed speed, type of wire, current, voltage, arc length, power settings, gas flow levels, etc.) The operator interface 78 may also include a port 80, which may allow an operator to connect an input device (e.g., mouse, keyboard, touchscreen, smart device), or an external memory component (U.S.B or other flash drive, etc.).

In some embodiments, the coordinated control circuitry 72 may be configured to receive a signal from a sensor 82 connected to the coordinated control system 16 by a conduit 84 and configured to sense a parameter of the joint 24 being welded. For example, in some embodiments, the sensor 82 may be an infrared sensor configured to sense the temperature, or the amount of heat, in the joint 24. In other embodiments, the sensor 82 may be an optical sensor (e.g., optical camera) configured to sense the presence of, or size of, holes (e.g., keyholes) in the joint 24. In further embodiments, the sensor 82 may be a UV sensor, an audio sensor, a voltage sensor, a current sensor, a power sensor, a sound sensor, a video sensor, a wire position sensor (e.g. config-ured to detect encoded wire) or a combination thereof. It should be understood, however, that these are non-limiting examples and that the sensor 82 may be configured to sense any parameter related to the welding operation being performed on the joint 24. Sensor 82 thresholds may either be mathematically defined. Data collected by the sensor 82 may be communicated back to the coordinated control circuitry 72 of the coordinated control system 16 via the conduit 84. Based upon the data received from the sensor 82, the coordinated control circuitry 72 may vary the parameters of the welding operation (e.g., wire feed speed, welding power, welding phase, position of the welding robot 20, etc.) in accordance with the routine or process being performed, or in accordance with inputs received from one or more of the operator interfaces 32, 48, 78.

The coordinated control system 16 may also include power conversion circuitry 86, which may be coupled to a power source 88. The power source 88 may be the same power source 41 that provides power to the power supply 12, or it may be a different power source. The power conversion circuitry 86 may be configured to receive power from the power source 88, convert the power if necessary, and then provide power to the welding robot 20 and/or the sensor 82.

Figure 2:
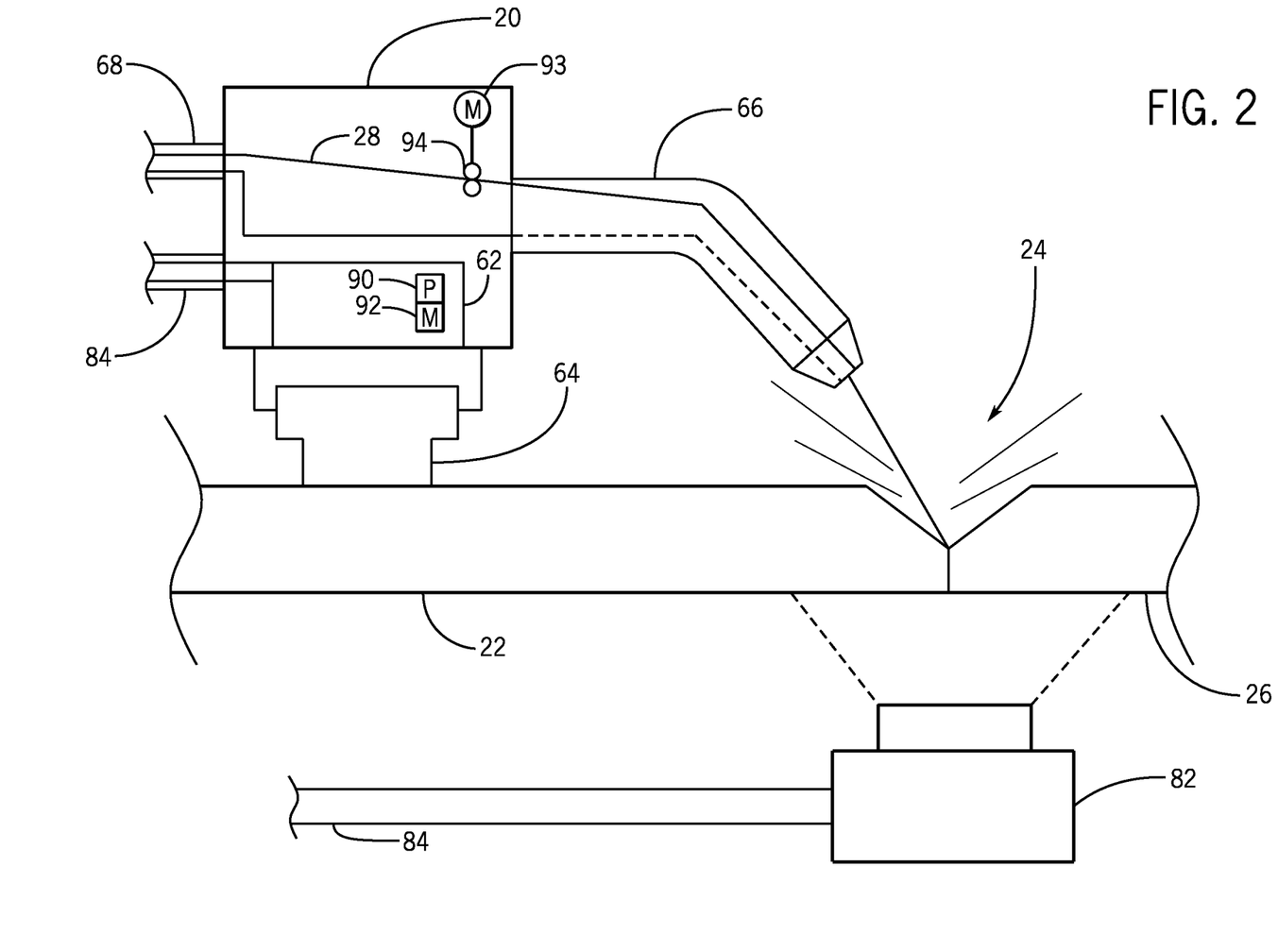
FIG. 2 is a schematic of an embodiment of the welding bug shown in FIG. 1 performing a root pass welding operation in accordance with aspects of the present disclosure.

FIG. 2 is a schematic of the welding robot 20 performing a welding operation on a joint 24. As discussed with regard to FIG. 1, two sections of pipe 22, 26 are disposed proximate each other to form a joint 24. A welding operation is performed by the welding robot 20 to join the two sections of pipe 22, 26. A track 64 may be mounted (e.g., clamped, fastened, riveted, adhered with a glue, etc.) to one section of pipe 22 to act as a guide for the welding robot 20. The welding robot 20 may be configured to travel around the circumference of the pipe 22 along the track 64 in order to perform the welding operation. The welding robot 20 may include a robotic system 62 to facilitate movement of the welding robot 20 along the track 64. The robotic system 62 may be an actuator, or some combination of components (actuator, control circuitry, processor 90, and/or memory 92, or some combination thereof) configured to receive a control signal from the coordinated control circuitry 72 and to move the welding robot 20 along the track 64 in accordance with that signal.

Shielding gas, welding wire 28, and/or power may be supplied to the welding robot 20 through a welding cable 68. During welding operations, the welding wire 28 may be advanced through the welding cable 68 toward the welding robot 20. Within the welding robot 20, an additional pull motor 93 may be provided with a drive roller(s) 94. When the welding robot 20 performs a welding operation, shielding gas may be flowed, welding wire 28 advanced, power applied to the welding cable 28, and through the welding torch 66 to the advancing welding wire 28.

A sensor 82, in communication with the coordinated control circuitry 72 may be disposed inside the pipe 22, 26 (e.g., on a side of the pipe 22, 26 opposite the welding robot 20), and configured to sense one or more parameters associated with the welding operation. In some embodiments, the sensor 82 may be any non-contact sensor. For example, in some embodiments, the sensor 82 may be an infrared camera configured to sense the amount of energy, heat, or the temperature of the joint 24. In other embodiments, the sensor 82 may be an optical sensor configured to sense when a "keyhole" has been opened or closed, the size of the keyhole, or when wire is pushing through the keyhole. Based upon the measurement signal communicated back to the coordinated control circuitry 72, the system 10 may perform a number of calculations (e.g., di/dt and/or dv/dt)

using data from one or more sensors 82, and may vary the various welding operation parameters (e.g., welding phase, current, voltage, wire feed speed, welding robot position, etc.).

Figure 3:
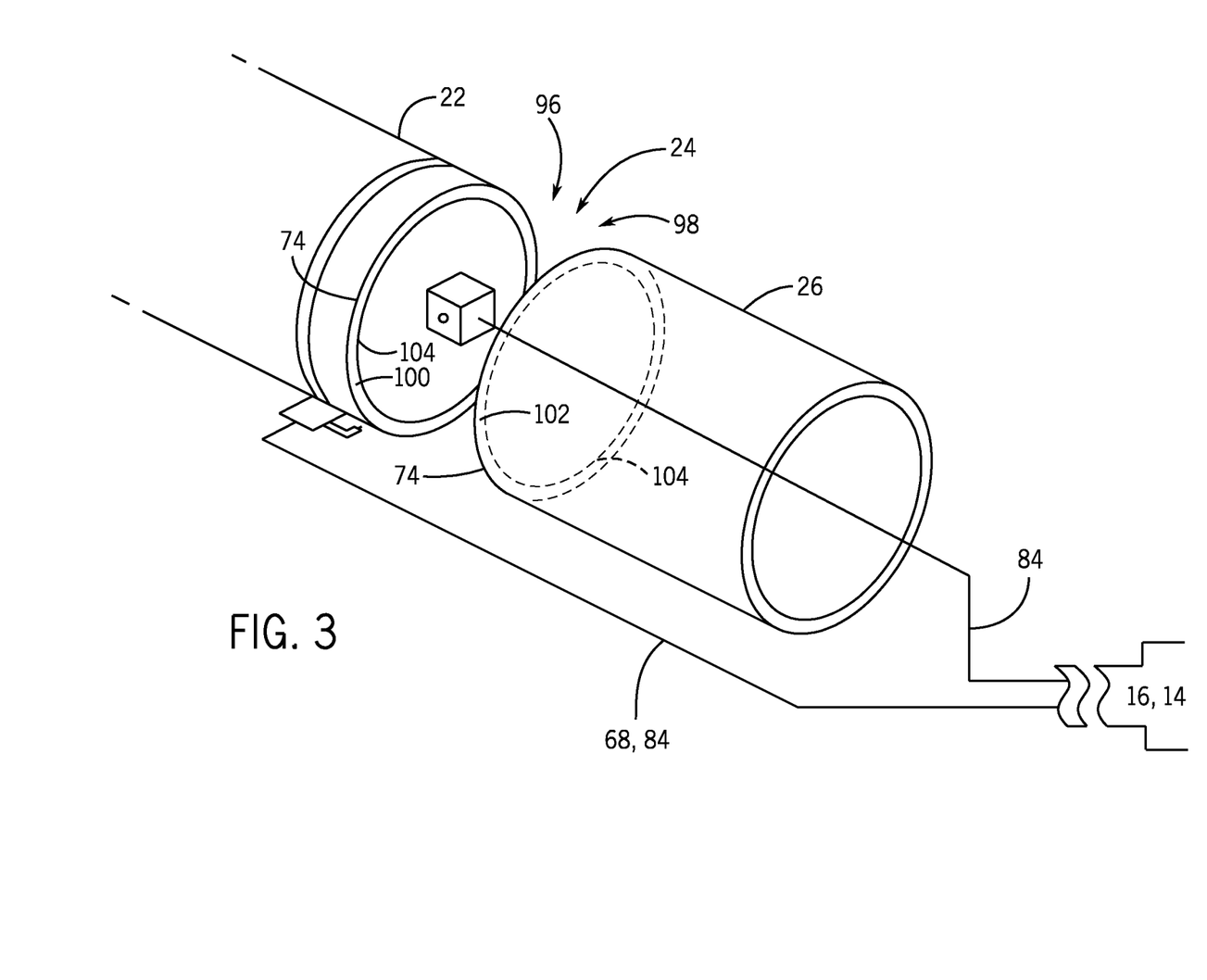
FIG. 3 shows two sections of pipe to be joined by the automated root pass welding system shown in FIG. 1 in accordance with aspects of the present disclosure.

FIG. 3 illustrates an embodiment of two sections of pipe 22, 26 that may be joined by the automated welding system described above. The sections of pipe 22, 26 of FIG. 3 include a first end 96 of a first pipe section 22 to be welded to a second end 98 of a second pipe section 26. A first face 100 of the first end 96 is to be welded to an opposing second face 102 of the second end 98. In some embodiments as discussed below, the first face 100 and/or the second face 102 may be beveled (not shown in FIG. 3, for clarity) to enable the welding torch 66 to readily join the root faces 104 (e.g., inner surfaces) of the first and second pipe sections 22, 26. The automated welding system 10 may be configured to provide a substantially uniform root weld bead along the entire root between the first and second pipe sections 22, 26. In some embodiments, the outer diameters of the first and second pipe sections 22, 26 may also be welded together, such that the outer diameter of the resulting pipe section is substantially uniform across the root between the first and second pipe sections 22, 26.

Figure 4A:
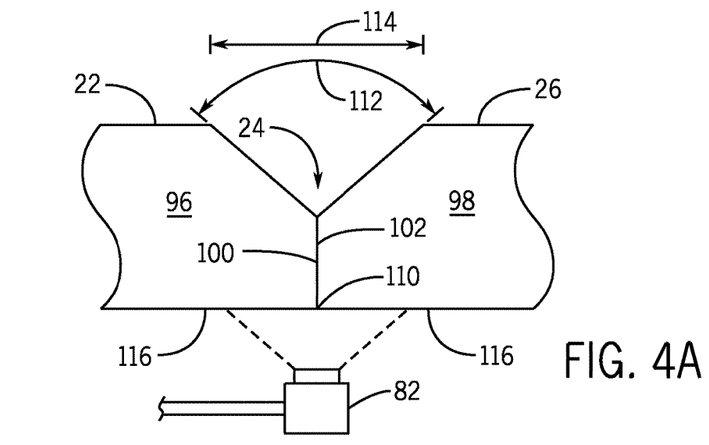
FIG. 4A shows the joint before welding has begun in accordance with aspects of the present disclosure.

FIGS. 4A-4D show a cross-section of joint 24 during various stages of a root pass welding operation using the disclosed systems and techniques. FIG. 4A shows a cross-section of the joint 24 of FIG. 3 between the first and second ends 96, 98 before welding has begun. In some embodiments, the first and second faces 100, 102 of the first and second ends 96, 98 may be butted up against one another with no root opening 110 between them. In other embodiments, due to variations in manufacture of the pipe sections 22, 26 within manufacturing tolerances, there may be a small root opening 110 between the first and second faces 100, 102 along a portion of, or all the way around the circumferences of the pipe sections 22, 26. The joint 24 of FIG. 4A illustrates the first and second sections of pipe 22, 26 having beveled edges forming a joint angle 112 between the opposing faces 100, 102. The outer opening 114 is greater than the root opening 110 to increase the accessibility to weld the root faces 116.

Figure 4B:
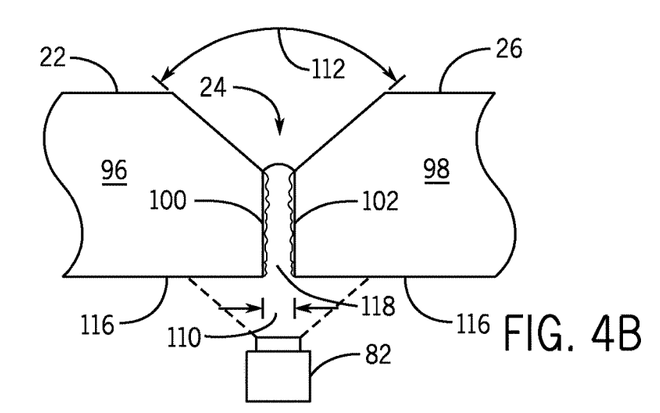
FIG. 4B shows the joint with a keyhole in accordance with aspects of the present disclosure.

A high energy welding phase (e.g., 300 amps) is used to create a keyhole 118 be heating (e.g., melting) the first and second ends 96, 98 near the joint 24 in order to open the root opening 110. Examples of high energy welding phases include high energy DC power pulse, CDC high energy half cycle phase, variable polarity, etc. FIG. 4B shows the joint 24 having a keyhole 118. The sensor 82 may be located opposite the joint 24 from the welding torch 66 (i.e., inside the sections of pipe 22, 26, or built into the material clamp), and configured to sense one or more parameters of the welding operation. For example, the sensor 82 may be an infrared camera configured to sense a parameter indicative of the temperature of the first and second ends 96, 98 near the joint 24. In other embodiments, the sensor 82 may be an optical sensor configured to detect when there is a keyhole 118 between the first and second ends 96, 98 (e.g., an opening between the first and second ends 96, 98 having an area large enough to be detected by the optical sensor 82, wherein the detected area of the keyhole 118 exceeds a predetermined threshold area). In yet other embodiments, the sensor 82 may be disposed outside of the pipe 22, 26 (e.g., on the welding robot).

Figure 4C:
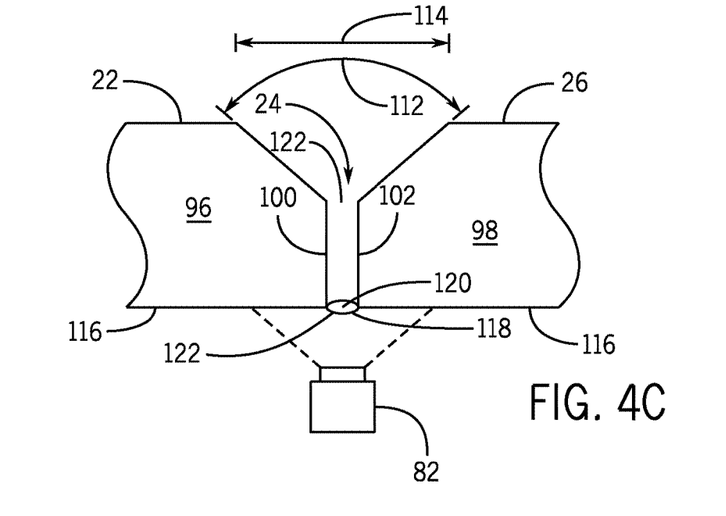
FIG. 4C shows the formation of a root pass weld in the joint in accordance with aspects of the present disclosure.

When the sensor 82 detects that the first and second ends 96, 98 have reached a set temperature, or that a keyhole 118 has been created, the automated welding system 10 transitions to a lower energy welding phase (e.g., 100 amps). Examples of low energy welding phases include RMD, RMD pulse, CSC, CSC pulse, short circuit, hot wire, variable polarity, resistive hot wire with or without a plasma transferring material, and the like). The automated welding system 10 uses the low energy welding phase to deposit weld material 120 in the keyhole 118 in order to form a weld 122. FIG. 4C shows the formation of a root pass weld 122 to close the root opening 110 using a low energy welding phase. The root pass weld 122 provides a smooth transition from the first section of pipe 22 to the second 26 at the root faces 116 inside the sections of pipe 22, 26.

Figure 4D:
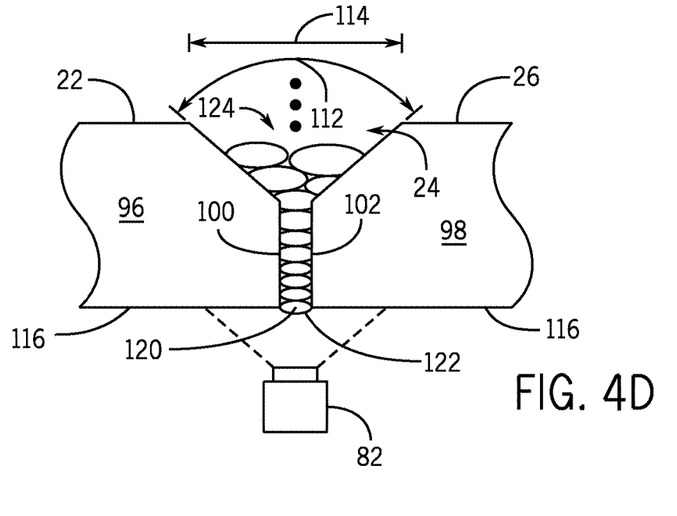
FIG. 4D shows the keyhole filled with weld material in accordance with aspects of the present disclosure.

The root pass weld 122 forms a foundation that may support filler weld material 120 provided by subsequent welding passes (FIG. 4D). Filling the keyhole 118 with weld material 120 to close the keyhole 118 may be done using a low energy weld phase. In some embodiments, however, the automated welding system 10 may shift back into a high energy welding phase if the weld material 120 begins to cool (e.g., the temperature, as sensed by the sensor 82 drops below a set threshold temperature). In other embodiments, optical sensors, keyhole 118 size, sound, or some other characteristic may be used to determine when the welding system 10 shifts back to a high-energy welding phase. For example, the sensor 82 may be an infrared camera configured to detect the amount of heat or the temperature of the root. In another embodiment, the sensor 82 may be an optical sensor configured to detect when a keyhole 118 has been created, or when there is otherwise a root opening 110 between the sections of pipe 22, 26. As shown in FIG. 4D, once the keyhole 118 is filled with weld material 120 to close the root opening 110, the automated welding system 10 may continue to use a low energy welding phase to deposit weld material 120 into the outer opening 114. As previously discussed, the automated welding system 10 may occasionally cycle back to a high energy welding phase to heat the deposited weld material 120 as needed. The automated welding system 10 may continue to deposit weld material 120 until the weld 122 fills the outer opening 114, or some other condition is satisfied (e.g., weld 122 thickness, mass or volume of the weld material deposited, etc.). In the present embodiment, once the weld operation has been performed at a given location, the welding robot 20 moves to a new location around the circumference of the pipes 22, 26. However, in other embodiments, the welding robot 20 may move continuously around the circumference of the sections of pipe 22, 26 while performing multiple passes of the welding operations depicted in FIGS. 4A-4D. In other embodiments, the welding robot 20 may move at variable speeds, stop, and in some cases even reverse direction. In some embodiments, the welding robot 20 may perform some of the steps shown in FIGS. 4A-4D (e.g., create and then fill the keyhole 118) on one pass around the circumference of the pipes 22, 26, and then finish the weld 122 on one or more subsequent passes around the circumference of the pipes 22, 26.

Figure 5:
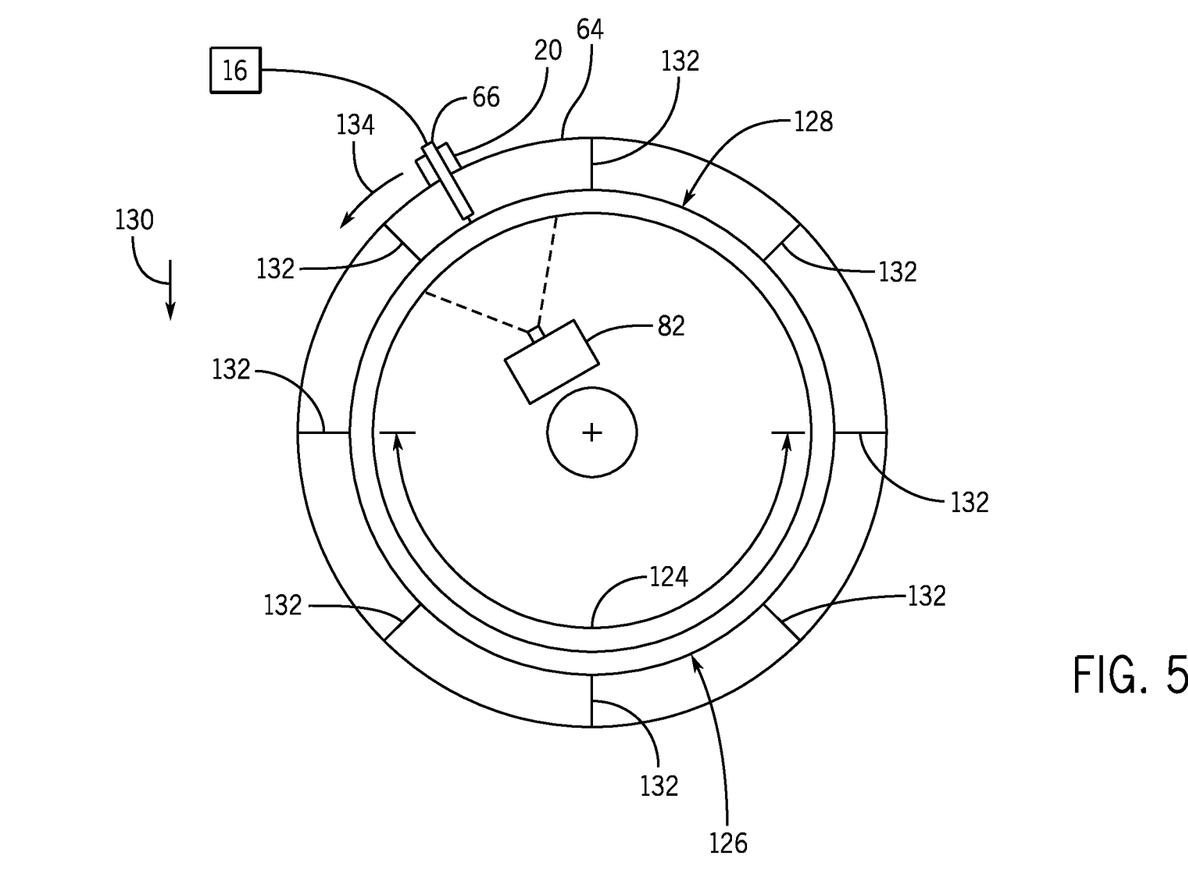
FIG. 5 is a cross-sectional view of the first section of pipe in accordance with aspects of the present disclosure.

FIG. 5 is a cross-sectional view of an embodiment of the first section of pipe 22 and the welding robot 20. As illustrated in FIG. 5, embodiments of a first arc length 124 may extend along a lower portion 126 of the pipe 22 that is below an upper portion 128, where the lower portion 126 is below the upper portion 128 relative to a vertical direction 130. The first arc length 124 may extend approximately 25 or 50 percent of the root face 116, such as along the lower portion 126 or approximately half of the lower portion 126. As may be appreciated, welding operations for the joint 24 along the lower portion 126 correspond to vertical and/or overhead welding positions such that gravity in direction 130 exerts a force on the weld material 120 away from the root face 116.

A welding robot 20 moves along a track 64 to deposit weld material 120 in the joint 24. The welding robot 20 may move along the track 64, thereby controlling the movement (e.g., circumferential movement) of the torch 66 along the joint 24 to deposit weld material 120. Members 132 mounted to the section of pipe 22 support the track 64. In some embodiments, the robotic system 62 may utilize multiple robotic drivers coupled to the track 64. In some embodiments, the welding robot 20 moves from the upper portion 128 of the pipe 22 to the lower portion 126 in the circumferential direction 134. The welding robot 20 may include a robotic system 62 to control and/or actuate movement of the welding robot 20 along the track 64. The robotic system 62 may cause the welding robot 20 to move along the track 64 at a constant speed, or at variable speeds. Furthermore, the robotic system may cause the welding robot to stop, and in some cases reverse direction along the track based on a pre-determined process or sensed parameters/conditions (e.g., keyhole condition). The coordinated control system 16 may be coupled to the welding robot 20 and configured to control the position of the welding robot 20. In some embodiments, the coordinated control system 16 may also be configured to control welding parameters (e.g., wire feed speed, current, voltage, shielding gas, etc.).

Figure 6:
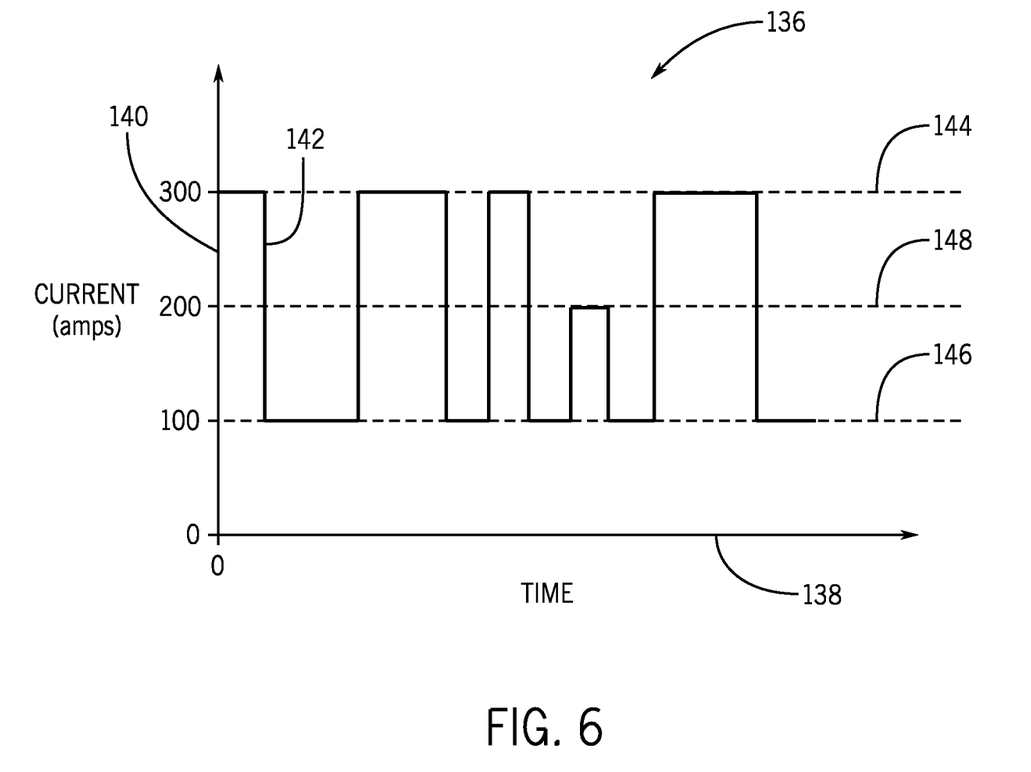
FIG. 6 is a plot of weld current while the welding operation is being performed in accordance with aspects of the present disclosure.

FIG. 6 is a plot 136 of the weld current as different welding phases are used during the performance of a welding operation. The x-axis represents time. The y-axis represents welding current (in amps). It should be understood, however, that a similar plot may be created having a y-axis of voltage, power, or any other parameter indicating the amount of energy used by the welding torch 66 during a welding phase. Curve 142 corresponds to the current used by the welding torch 66 as the automated welding system 10 utilizes different weld phases in order to complete a welding operation. As shown in FIG. 6, the automated welding system 10 begins by using a high energy welding phase 144 to create a keyhole 118. Once the keyhole 118 has been created, the automated welding system 10 transitions to a low energy welding phase 146. The automated welding system 10 may oscillate back and forth between the high energy phase 144 and the low energy phase 146 as needed until the welding operation is complete. In some embodiments, the automated welding system 10 may utilize one or more intermediate welding phases 148, which may be have an energy somewhere between the low energy phase 146 and the high energy phase 144.

Figure 7:
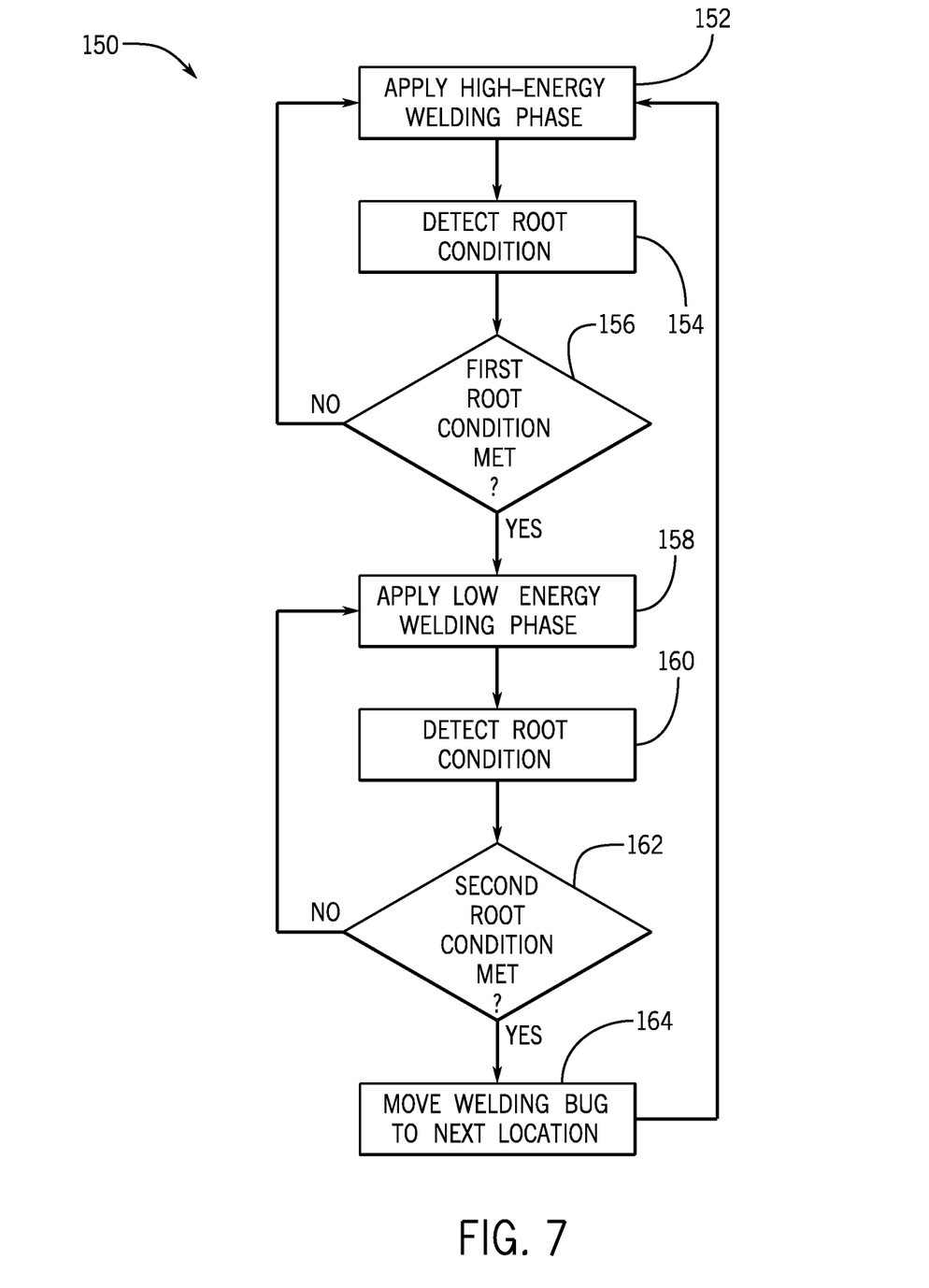
FIG. 7 is a flowchart of a process for performing a root pass welding operation in accordance with aspects of the present disclosure.

FIG. 7 is a flowchart of a process 150 of performing a root pass welding operation using the automated welding system 10. In block 152, the process 150 uses a high energy (e.g., 300 amps) welding phase to create a keyhole 118 between the first end 96 of the first section of pipe 22 and the second end 98 of the second section of pipe 26. Examples of high energy phases include high energy DC power pulse, CDC high energy half cycle phase, variable polarity, spray, pulse spray, pulse assisted by CSC, modified short circuit, etc., or other processes to create the high energy keyhole 118. The high energy phase may be one or more high energy pulses with a lower current for creating the keyhole. The high energy welding phase may utilize a higher wire feed speed than the low energy welding phase. The high energy welding phase may include generating a current greater than 100 amps, greater than 125 amps, greater than 150 amps, greater than 175 amps, greater than 200 amps, greater than 225 amps, greater than 250 amps, greater than 275 amps, greater than 300 amps, greater than 325 amps, greater than 350 amps, greater than 375 amps, greater than 400 amps, or any other current.

In block 154, a condition of the root may be detected. In some embodiments, the root condition is detected by the sensor 82 located inside the sections of pipe 22, 26 and directed toward the root faces 116. In one embodiment, the sensor 82 may be an infrared camera configured to detect the amount of heat or the temperature of the root. In another embodiment, the sensor 82 may be an optical sensor configured to detect when a keyhole 118 has been created, the keyhole size, or when there is otherwise a root opening 110 between the sections of pipe 22, 26 (e.g., light coming through the keyhole 118 in various spectrums from infrared to ultraviolet, to visible light, and in between).

In decision 156, the process 150 determines whether a first root condition is met. In some embodiments, the root condition may be that the root temperature exceeds a specified temperature, or that the root temperature falls within a set (e.g., relatively high) range of temperatures. In other embodiments, the root condition may be the creation of a keyhole 118. The root condition may be any condition that indicates the task to be performed using the high energy weld phase has been completed. If the root condition has not been met, the process 150 returns to block 152 and continues to apply the high energy weld phase. If the root condition has been met, the process 150 moves to block 158 and transitions to a low energy weld phase.

In block 158, the process 150 uses a low energy welding phase to deposit weld material 120 in the joint 24 between the first end 96 of the first section of pipe 22 and the second end 98 of the second section of pipe 26. The process 150 may first perform a root pass weld 122 between the root faces 116 of the two sections of pipe 22, 26. The process 150 may then deposit additional weld material 120 on top of the root pass weld 122 to fill the joint 24. The low energy phase may be RMD, RMD pulse, CSC, CSC pulse, short circuit, hot wire, and the like, or combinations thereof. The low energy welding phase may utilize a lower wire feed speed than the high energy welding phase. The low energy welding phase may include generating a current less than 275 amps, less than 250 amps, less than 225 amps, less than 200 amps, less than 175 amps, less than 150 amps, less than 125 amps, less than 100 amps, less than 75 amps, less than 50 amps, or any other current.

In block 160 the process 150 determines whether the second root condition is met. In some embodiments, the root condition may be that the root temperature has fallen below a specified temperature, or that the root temperature falls within a set (e.g., relatively lower) range of temperatures. In other embodiments, the second root condition may be the closure of a keyhole 118, or a set amount of time passed or weld material deposited (determined using the wire feed speed, for example) since closure of the keyhole 118. The second root condition may be any other condition that indicates the task to be performed using the low energy weld phase has been completed. If the second root condition has not been met, the process 150 returns to block 158 and continues to apply the low energy weld phase. If the second root condition has been met, the process 150 moves to block 164 and moves the welding robot 20 to the next location.

In block 164, the welding robot 20 is moved to the next location. Alternatively, in some embodiments, the welding robot 20 may move continuously around the circumference of the pipe 22 while performing the welding operation. In such embodiments, block 164 may be omitted as the coordinated control circuitry 72 constantly monitors and/or controls the movement of the welding robot 20 during the welding operation. The coordinated control circuitry 72 may send a signal to the robotic system 62, which may then facilitate movement of the welding robot 20 in a circumferential direction 134 around the circumference of the first and second sections of pipe 22, 26. In other embodiments, the welding robot may remain stationary and the sections of pipe may rotate. Once the welding robot 20 has been moved to the next location, the process 150 returns to block 152 and uses a high energy welding phase to create a keyhole 118 at the new location.

Technical effects of the presently disclosed embodiments include root pass welding techniques that may be used to improve the weld quality of root pass welds performed by automated welding systems. The described techniques may be implemented to save time and reduce costs by improving the rate at which root pass welds pass quality inspections. Implementation of the disclosed techniques may reduce the number of instances where welds must be repaired of redone in order to pass inspection.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An automated root pass welding system comprising:
   a welding torch configured to perform a root pass welding operation at a joint between a first workpiece and a second workpiece;
   a welding robot configured to move at least one of the welding torch and the first workpiece relative to one another; and
   control circuitry configured to:
      control movement of the welding robot and the first workpiece relative to one another;
      apply a first energy welding phase via the welding torch to establish a first root condition;
      detect that the first root condition has been established based on data associated with one or more parameters of the joint from a sensor; and
      apply a second energy welding phase via the welding torch to establish a second root condition in response to detecting the first root condition has been established, wherein a first energy level associated with the first energy welding phase is greater than a second energy level associated with the second energy welding phase wherein the first root condition is creation of a keyhole between the first and second workpieces.

2. The automated root pass welding system of claim 1, comprising a sensor configured to sense one or more parameters indicative of the first and second root conditions, wherein the sensor outputs a root condition signal to the control circuitry.

3. The automated root pass welding system of claim 2, wherein the sensor is an infrared camera.

4. The automated root pass welding system of claim 2, wherein the sensor is an optical sensor.

5. The automated root pass welding system of claim 2, wherein the sensor is configured to sense a parameter indicative of a keyhole size, a parameter indicative of welding wire pushing through the joint, or both.

6. The automated root pass welding system of claim 2, wherein the sensor is a voltage sensor or a current sensor.

7. The automated root pass welding system of claim 2, wherein the sensor is a power sensor.

8. The automated root pass welding system of claim 2, wherein the sensor is an audio sensor.

9. The automated root pass welding system of claim 2, wherein the sensor is a wire position sensor.

10. The automated root pass welding system of claim 2, wherein the control circuitry is configured to determine establishment of the first and second root conditions based at least in part upon the root condition signal received from the sensor.

11. The automated root pass welding system of claim 1, wherein the second root condition is that the joint is filled with deposited weld material.

12. The automated root pass welding system of claim 1, wherein the first energy welding phase includes providing a current greater than 150 amps to the welding torch.

13. The automated root pass welding system of claim 12, wherein the first energy welding phase includes providing welding wire at a first wire feed speed.

14. The automated root pass welding system of claim 13, wherein the second energy welding phase includes providing a current less than 250 amps to the welding torch.

15. The automated root pass welding system of claim 14, wherein the second energy welding phase includes providing welding wire at a second wire feed speed, wherein the second wire feed speed is lower than the first wire feed speed.

16. The automated root pass welding system of claim 1, wherein the welding robot is configured to move the welding torch in a direction substantially perpendicular to a direction of movement of the welding robot.

17. The automated root pass welding system of claim 1, wherein the welding robot comprising a motion control assembly comprising a motor and a cam, wherein the motion control assembly is configured to move a welding wire in a desired pattern with respect to a central axis of the welding torch.

18. A system comprising:
   a welding torch configured to perform a root pass welding operation at a joint between a first pipe and a second pipe;
   a welding robot configured to move at least one of the welding torch and the first pipe relative to one another;
   a sensor configured to detect one or more parameters indicative of first and second root conditions, and to output a root condition signal; and
   control circuitry configured to:
      receive the root condition signal from the sensor;
      control movement of the welding robot and the first pipe relative to one another based at least in part on the received root condition signal;
      control a rate at which a wire feeder supplies welding wire to the welding robot based at least in part on the received root condition signal;
      control an amount of welding power a power supply supplies to the welding robot in response to the received root condition signal;
      apply a first energy welding phase of the welding power until the root condition signal indicates establishment of the first root condition; and
      apply a second energy welding phase of the welding power in response to the first root condition, and continue to apply the second energy welding phase until the root condition signal indicates establishment of the second root condition, wherein a first energy level associated with the first energy welding phase is greater than a second energy level associated with the second energy welding phase wherein the first root condition is creation of a keyhole between the first and second pipes.

19. The system of claim 18, wherein the first energy welding phase includes the welding power having a current greater than 150 amps.

20. The system of claim 18, wherein the second energy welding phase includes the welding power having a current less than 250 amps.

21. The system of claim 18, wherein the sensor is an infrared camera.

22. The system of claim 18, wherein the sensor is an optical sensor.

23. The system of claim 18, wherein the system is configured to perform a current, a voltage, or a power calculation based at least in part on the received root condition signal.

24. The system of claim 18, wherein the system is configured to output a control signal based on signals received from a plurality of sensors.

25. A welding method comprising:
applying a first energy welding phase of welding power, using a welding torch attached to a welding robot, to a joint formed between first and second sections of pipe;
receiving, from a sensor disposed radially inside the first or second sections of pipe, a first root condition signal that indicates establishment of a first root condition;
switching from the first energy welding phase of the welding power to the second energy welding phase of the welding power in response to the first root condition signal;
applying a second energy welding phase of the welding power to the joint wherein a first energy level associated with the first energy welding phase is greater than a second energy level associated with the second energy welding phase;
receiving, from the sensor, a second root condition signal that indicates establishment of a second root condition;
switching from the second energy welding phase of the welding power to the first energy welding phase of the welding power in response to the second root condition signal; and
moving the welding robot and the first section of pipe relative to one another wherein the first root condition is creation of a keyhole between the first and second sections of pipe.

26. The welding method of claim 25, wherein the sensor is an infrared camera.

27. The welding method of claim 25, wherein the sensor is an optical sensor.

28. The welding method of claim 25, wherein the sensor is a voltage sensor, current sensor, or power sensor.

29. The welding method of claim 25, wherein the second energy welding phase of the welding power includes a current less than 250 amps, and the first energy welding phase of the welding power includes a current greater than 150 amps.

30. The welding method of claim 25, comprising applying variable polarity to the joint.

31. The welding method of claim 25, wherein the second energy welding phase is applied as needed to create penetration with controlled burn through.

32. The welding method of claim 25, wherein the first energy welding phase of welding power is applied for a first duration of time and the second energy welding phase of welding power is applied for a second duration of time different than the first duration.

* * * * *